Jan. 9, 1934.  H. NAEDER  1,943,184
BRAKE MECHANISM
Filed Oct. 16, 1929  3 Sheets-Sheet 1
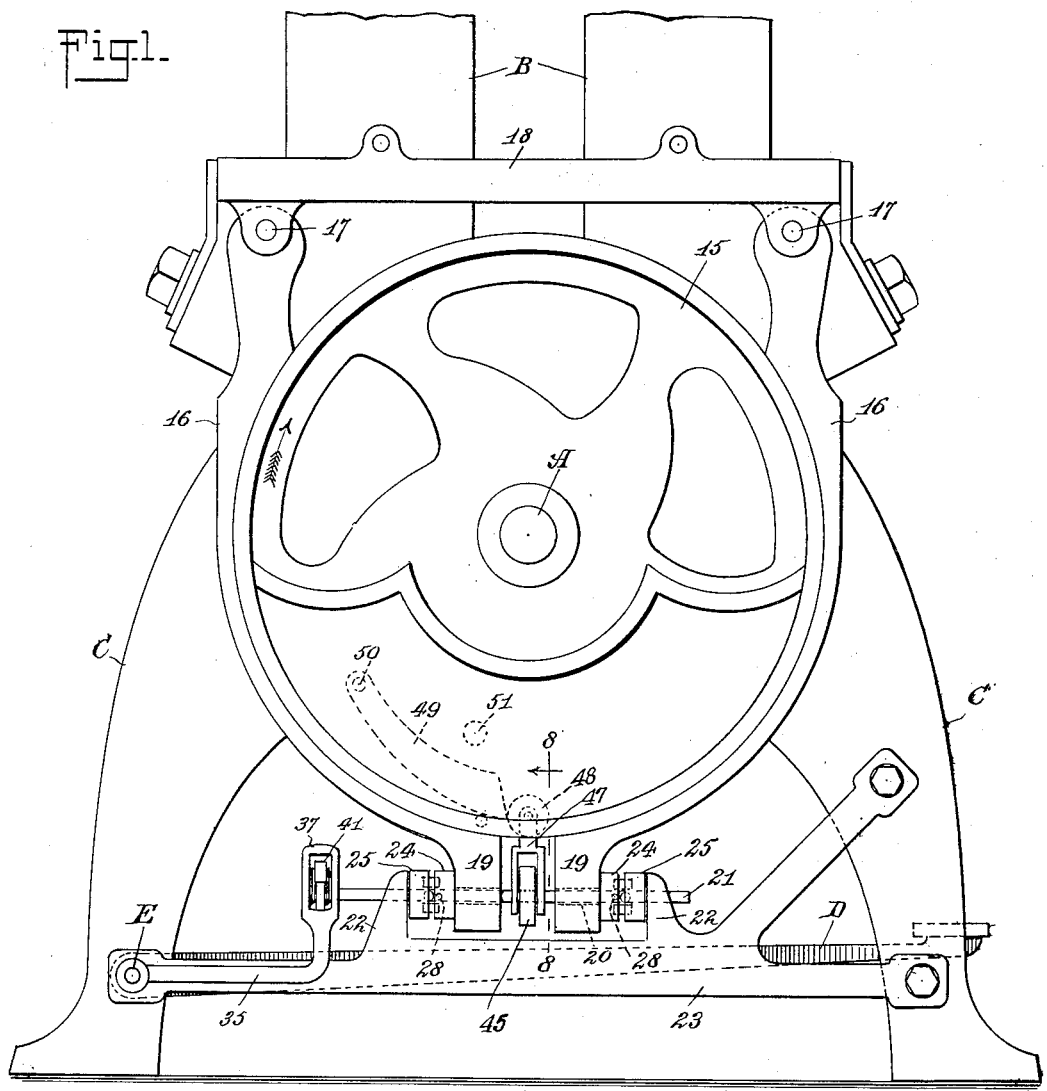
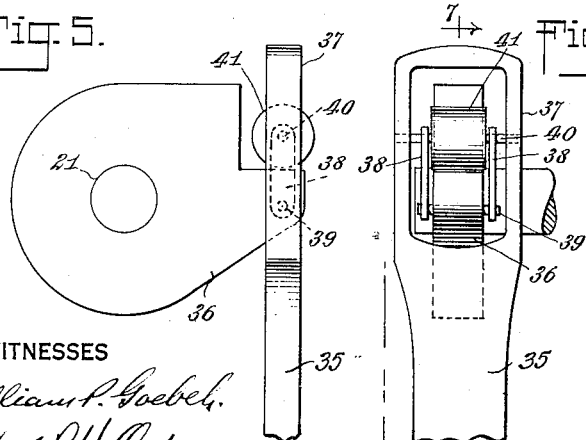
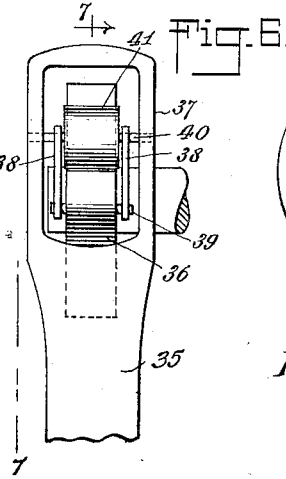
WITNESSES
INVENTOR
Henry Naeder
BY
ATTORNEYS

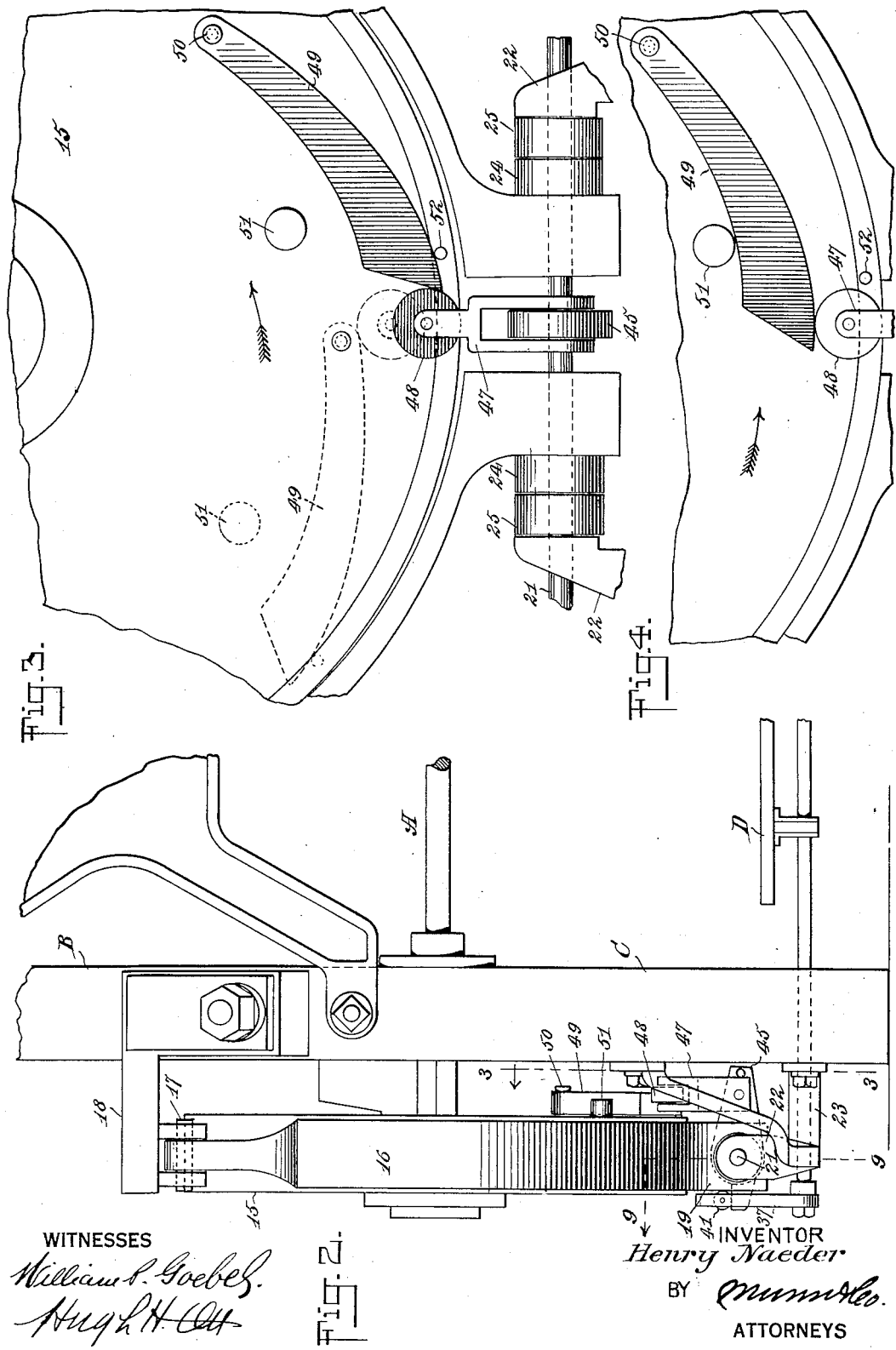

Jan. 9, 1934.  H. NAEDER  1,943,184
BRAKE MECHANISM
Filed Oct. 16, 1929  3 Sheets-Sheet 3
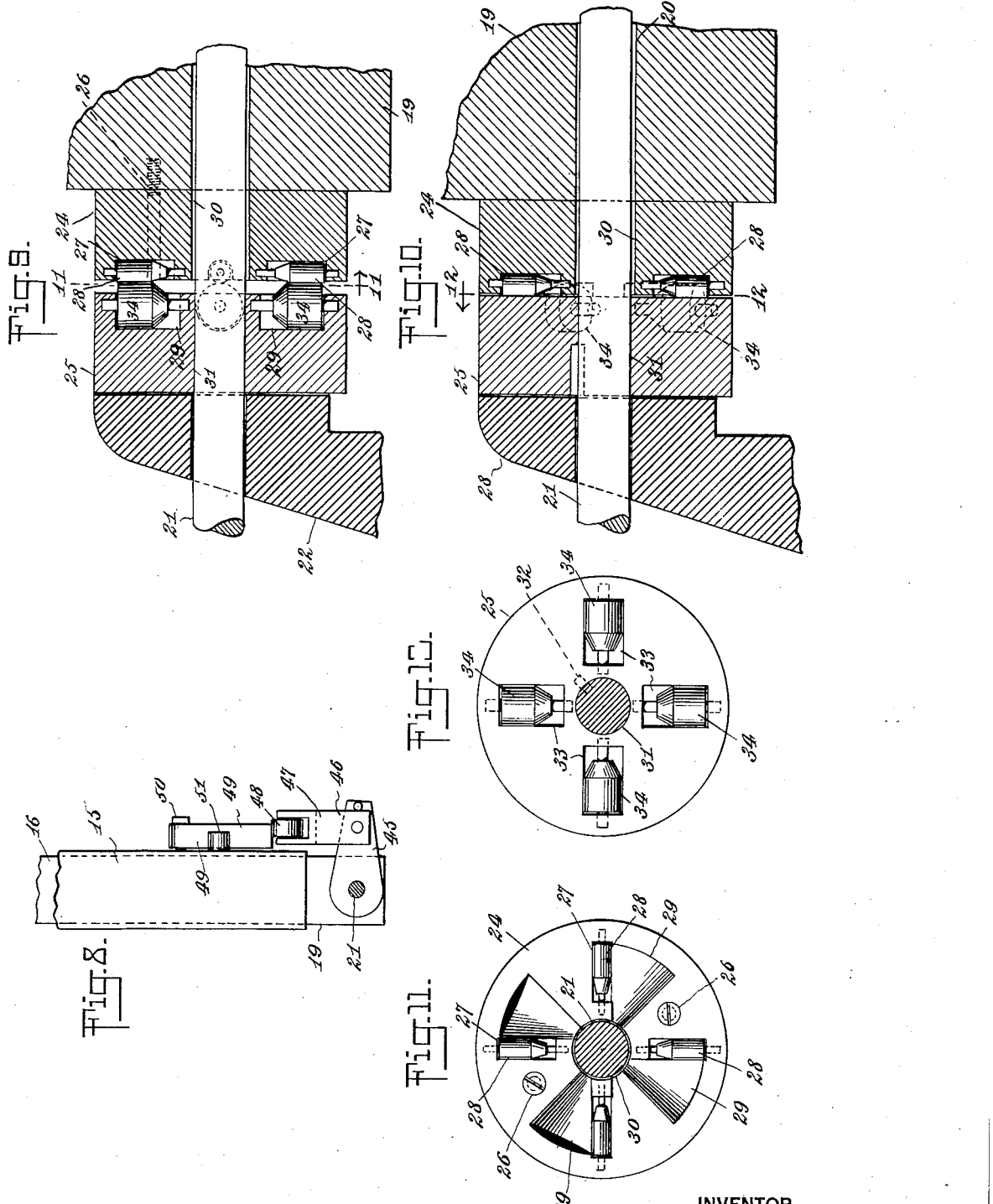

Patented Jan. 9, 1934

1,943,184

UNITED STATES PATENT OFFICE 1,943,184

BRAKE MECHANISM

Henry Naeder, St. Louis, Mo., assignor of one-half to Emil W. Reitermann, St. Louis, Mo.

Application October 16, 1929. Serial No. 400,024

8 Claims. (Cl. 192—144)

This invention relates to mechanism for stopping a rotating part of a machine precisely upon the completion of a single revolution thereof; for instantly releasing said part upon starting of a revolution thereof; and for overcoming any tendency of said part to turn in a reverse direction to that intended.

In its principal application, the mechanism has been designed as an improvement upon the stop or brake mechanism of a leather cutting machine of the type set forth in United States Letters Patent No. 368,108, granted August 9, 1887, but it is to be clearly understood that the invention is not limited to use on this machine or others in this field, but that the device may be employed generally in connection with machines having an element or part which is adapted to make a single revolution upon each operation thereof and in which the machine includes a pedal or manipulating member for initiating each operation thereof.

The present invention, therefore, comprehends an improved mechanism of the character set forth which functions to positively effect the stopping of a rotary element or part of a machine precisely upon the completion of a single revolution in order to avoid repeating of an operation.

The invention furthermore contemplates a stop or brake mechanism of the character set forth which permits of the instantaneous release of the element or part for rotation when a subsequent operation is to be initiated.

The invention furthermore aims to provide in a mechanism of this character, means which precludes the tendency of the rotary part or element to turn in reverse direction to that intended, thereby insuring proper functioning of the machine at all times.

Other objects reside in the comparative simplicity of construction of the mechanism and its mode of operation, the economy with which it may be produced and installed and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a fragmentary end view of a machine equipped with a brake or stop mechanism constructed in accordance with the invention and illustrating said mechanism in active applied position.

Figure 2 is a fragmentary front view of the machine equipped with the brake or stop mechanism and illustrating said mechanism in edge elevation.

Figure 3 is an enlarged fragmentary sectional view taken approximately on the line indicated at 3—3 in Figure 2, and illustrating in full and dotted lines the position of parts when the machine is at rest and immediately prior to the stopping of the machine.

Figure 4 is a similar view illustrating the position of parts immediately prior to the application of the brake upon completion of an operation.

Figure 5 is an enlarged detail side elevation of the connection between the rock shaft and its actuating arm, the parts being in normal position with the stop or brake mechanism applied.

Figure 6 is an edge view thereof.

Figure 7 is a sectional view taken approximately on the line indicated at 7—7, with the parts moved to a position to release the stop or brake mechanism.

Figure 8 is a fragmentary enlarged sectional view taken approximately on the line 8—8 of Figure 1, illustrating the brake or stop mechanism resetting means in a position immediately prior to the application of the brake.

Figure 9 is an enlarged fragmentary sectional view taken approximately on the line indicated at 9—9 in Figure 2, illustrating the brake shoe actuating means in its active position for applying the brake shoe to the brake wheel.

Figure 10 is a similar view illustrating said means in its released position.

Figure 11 is a transverse sectional view taken approximately on the line 11—11 of Figure 9.

Figure 12 is a similar view taken approximately on the line indicated at 12—12 in Figure 10.

Referring to the drawings by characters of reference, A designates the rotating shaft or part of the machine designed to make a single revolution upon each operation of the machine, and said shaft extends through and is suitably journaled in the frame B of the machine, which frame includes the depending supporting legs C. The machine also includes a pedal D or equivalent manipulating lever which when depressed or moved in a predetermined direction operates a suitable mechanism (not shown), for the purpose of initiating the operation of the machine to impart rotary motion to the shaft or part A.

The brake or stop mechanism which constitutes the subject matter of the present invention includes a brake wheel 15 keyed or otherwise secured to the shaft A for rotation therewith and one or more brake shoes 16 which are suitably supported by the machine in juxtaposition to the brake wheel. The brake shoes 16 are normally moved to a position out of engagement with the brake wheel in any desired manner but, as illustrated, this is accomplished by fulcruming the brake shoes at 17 to a suitable support 18 attached to the frame of the machine so that the shoes are suspended in such a manner that they gravitationally move out of engagement with the periphery of the brake wheel. In carrying the invention into practice, it is preferable to employ a pair of brake shoes 16, although it is to be understood that a single brake shoe or a plurality may be employed if found necessary or desirable without departing from the scope or spirit of the invention. Each brake shoe 16 is formed at its lower end with an angularly disposed ear 19, and said ears are provided with aligned apertures 20 through which a rock shaft 21 extends. The rock shaft 21 is suitably supported in the bearings 22 of a bracket 23 which is attached to the legs C of the machine frame. Cooperating elements 24 and 25 are carried respectively by each ear and by the rock shaft, which function when rocking motion is imparted to the shaft 21 in one direction, to advance the brake shoes 16 into frictional engagement with the periphery of the brake wheel 15. When the rock shaft is rocked in the opposite direction, the elements 24 and 25 function to release the brake shoes 16 and permit them to gravitate to a normal released position out of engagement with the brake wheel 15. As specifically illustrated, the elements 24 which are carried by the brake shoe ears 19 are in the nature of cylindrical members which may be formed integral with the ears or separately, as illustrated, and secured in place by the machine screws 26. On its outermost face, each element 24 is formed with radially disposed circumferentially spaced recesses 27, within each of which rollers 28 are journaled, with the axes of said rollers disposed radially and with their peripheries terminating flush with the outer face of the member 24. The members 24 on their outer faces are formed with semi-conical depressions 29, one being provided for each roller 28 and disposed alongside of or adjacent to the roller. It will also be apparent that each of the members 24 is formed with an opening or axial bore 30 through which the rock shaft 21 loosely extends. The elements 25 are of similar form to the elements 24 and are each provided with a central or axial opening or bore 31 which snugly receives the rock shaft 21 and which is keyed or otherwise secured as at 32 to the rock shaft for turning movement therewith. The face of the element 25 which confronts the outer face of the element 24 is provided with radially disposed circumferentially spaced recesses 33 in which rollers 34 are journaled on axes which radiate from the rock shaft. The rollers 34 are of larger diameter than the rollers 28 and their peripheries extend beyond the face of the element 25 to either lie within the depressions 29 or to contact with the peripheries of the rollers 28. When the rock shaft 21 is rocked in one direction, it is obvious that the peripheries of the rollers 34 contacting with the peripheries of the rollers 28 will cam and advance the brake shoes 16 toward and in frictional engagement with the periphery of the brake wheel 15. When the rock shaft 21 is rocked in the opposite direction, the rollers 34 will be turned into registry with the depressions 29 to permit the brake shoes 16 to gravitate to an inactive position.

The means for imparting rocking motion to the rock shaft consists of a lever 35 which is secured to the pedal shaft E or otherwise actuated by the pedal D to swing back and forth with the pedal. The lever 35 is operatively connected with the rock shaft for imparting rocking motion thereto in a direction to release the brake shoes but, as illustrated, this connection consists of an arm 36 secured to the rock shaft and projecting radially therefrom and into a yoke 37 formed at the terminal of the lever 35. The arm 36 is attached to the yoke 37 by links 38, which links are attached at one end to the arm 36 by a transverse pin 39 and which links are attached at their opposite ends to the yoke 37 by a transverse pin 40. A roller 41 is journaled on the pin 40. In practice, when the pedal or equivalent manipulating element D is depressed by the operator to start the rotation of the shaft or part A of the machine, the arm 35 is swung downwardly to rock the shaft 21 in a direction to cause the elements 24 and 25 to release the brake shoes 16 instantly, permitting the shaft or part A of the machine to be turned in the direction indicated by the arrow in Figures 1, 3 and 4. As is common in machines of this type, the operator removes his foot from the pedal or releases the operating element D, and suitable mechanism, forming part of these machines, serves to continue the application of power to the shaft or part A until the same has approximately completed a single revolution.

It will be noted that the links 38 connect the member 36 with the yoke 37 of the arm 35 so that when the treadle D is depressed the shaft 21 through the member 26 and its connection with the yoke 37, will be rocked for releasing the brake shoe 16 from the brake wheel 15. The pedal remains in the depressed position while the member 47 is elevated placing the roller 48 in position to be engaged by the pawl 49. The brake wheel 15 is free to be rotated by the shaft A and since power is applied to the shaft the brake wheel 15 is revolved.

When the member 49 moves to the dotted line position in Fig. 3 it will begin to engage the wheel 48 and depress the member 47, thereby rocking the arm 45 and the shaft 21 so that the brakes 16 are applied to the wheel 15, thereby stopping rotation of the same. Since the member 36 is directly connected with the yoke 37, as has been previously explained, and as shown in Figs. 5 to 7, inclusive, the depressing of the member 47 and the rocking of the shaft 21 will raise the treadle D through its connection with the shaft E and the arm 35 so that the treadle D will be in a position to be actuated manually when it is desired to again initiate rotation of the brake wheel 15.

As has been explained, the device is intended to be rotated and stopped at each single revolution of the brake wheel 15 and the depression of the pedal D rocks the shaft E through connections not shown and operates a clutch for connecting the shaft A with the driving means. Since the driving means and the clutch form no part of the present invention they have not been illustrated or described.

In order to provide means for re-applying the brake shoes 16 to the brake wheel 15 at the precise moment when a complete revolution has been made, a lever arm 45 is secured to the rock shaft 21 and projects radially therefrom, preferably at a point intermediate its ends and between the brake shoe ears 19. The free end of the lever arm 45 has fulcrumed thereto the bifurcated lower end 46 of a roller bracket 47, within the upper end of which a roller 48 is journaled. The roller 48 is disposed in the path of movement of a pawl 49 which is fulcrumed at 50 on the brake wheel 15 and which is capable of inward and outward swinging movement, limited respectively by stop pins 51 and 52. The stop pin 51 is so positioned with respect to the pawl as to engage with and force said pawl into contact with the roller 48 whereby to, in effect, cam the same downwardly. Obviously, this swings the lever arm 45 downwardly to rock the rock shaft 21 in a reverse direction, thereby causing the cooperating elements 24 and 25 to advance the brake shoes 16 into frictional engagement with the periphery of the brake wheel 15. Obviously, the pawl 49 rides over and slightly beyond the roller 48, where it drops by gravity into engagement with the stop pin 52 and engages behind the roller 48 in such a manner as to positively preclude retrograde movement of the brake wheel 15 and the element or part A of the machine when the brake shoes are released for the next operation of the machine.

As shown in Fig. 4, the pawl 49 is being carried around by the brake wheel 15 with the pin 51 limiting the upward swinging movement of the pawl so that it will depress the roller, and the yoke 47 and thereby cause rocking of the shaft 21 to substantially complete the braking action of the shoes 16 at about the time that the free end of the pawl 49 has reached a position on the roller 48 where the free end will roll off the surface of said roller. The clutching elements shown in Figs. 11 and 12 will have been moved to locked position and the complete braking action of the brake wheel will occur. Thus it will be seen that the complete braking action of the shoes or stopping of the brake wheel 15 will occur at a definite point in the revolution of the wheel which is 360° and at a point where the free end of the pawl 49 will just clear the roller 48, as shown in Fig. 3. At this time the free end of the pawl has moved into engagement with the lower portion of the roller and will thus prevent retrograde movement of the brake wheel.

From the foregoing construction and arrangement, it is obvious that the mechanism devised will serve to stop a rotating part of a machine precisely upon the completion of a single revolution and will avoid repetition of an operation. It is also apparently that immediately upon depression of the pedal or manipulation of the manipulating element D, the brake shoes will instantly release while any tendency on the part of the machine to turn in a reverse direction to that intended, will be overcome.

What is claimed is:

1. The combination with a machine having a rotary member adapted to make a single revolution upon each operation thereof and including a pedal for initiating each operation; of a mechanism for stopping said member precisely upon the completion of a single revolution, for preventing retrograde movement thereof and for instantly releasing said member at the beginning of each operation, said mechanism including a brake wheel secured to the rotary member for turning movement therewith, a brake shoe normally disposed out of contact with the brake wheel, a rockable element, interengageable means on the brake shoe and rockable element operable to apply the shoe to the wheel when said element is rocked in one direction and serving when the element is rocked in the opposite direction, to permit of the movement of the shoe to its normal released position; co-operating means on the rockable element and wheel for actuating the rockable element at each complete revolution of the wheel and for preventing retrograde movement of the wheel; and means of connection between the machine pedal and the rockable element for imparting rocking motion to the latter.

2. The combination with a machine having a rotary member adapted to make a single revolution upon each operation thereof and including a pedal for initiating each operation; of a mechanism for stopping said member precisely upon the completion of a single revolution, for preventing retrograde movement thereof and for instantly releasing said member at the beginning of each operation, said mechanism including a brake wheel secured to the rotary member for turning movement therewith, a brake shoe normally disposed out of contact with the brake wheel, a rockable element, interengageable means on the brake shoe and rockable element operable to apply the shoe to the wheel when said element is rocked in one direction and serving when the element is rocked in the opposite direction, to permit of the movement of the shoe to its normal released position; and means of connection between the machine pedal and the rockable element for rocking the latter in a direction to permit of the release of the shoe and coacting means on the rockable element and brake wheel operable at the completion of each revolution of the rotary member of the machine, to rock said element in an opposite direction for applying the shoe to the brake wheel, the co-acting means on the brake wheel acting as a pawl to engage the coacting means on the rockable element to prevent retrograde movement of said wheel.

3. The combination with a machine having a rotary member adapted to make a single revolution upon each operation thereof and including a pedal for initiating each operation; of a mechanism for stopping said member precisely upon the completion of a single revolution, for preventing retrograde movement thereof and for instantly releasing said member at the beginning of each operation, said mechanism including a brake wheel secured to the rotary member for turning movement therewith, a brake shoe normally disposed out of contact with the brake wheel, a rockable element, interengageable means on the brake shoe and rockable element operable to apply the shoe to the wheel when said element is rocked in one direction and serving when the element is rocked in the opposite direction, to permit of the movement of the shoe to its normal released position; and means of connection between the machine pedal and the rockable element for rocking the latter in a direction to permit of the release of the shoe and coacting means on the rockable element and brake wheel operable at the completion of each revolution of the rotary member of the machine, to rock said element in an opposite direction for applying the shoe to the brake wheel, said latter means being in abutting relation when the brake shoe has been applied and serving to prevent retrograde movement of the rotary member of the machine when the brake shoe is subsequently released.

4. The combination with a machine having a shaft adapted to make a single revolution at each operation of the machine and including a manually controlled member for initiating said operation; of braking mechanism for stopping the rotation of said shaft precisely upon the completion of a single revolution thereof and for preventing retrograde movement thereof, said braking mechanism including a brake wheel keyed to said shaft, a pair of brake shoes normally movable to a position out of engagement with the brake wheel, a rock shaft operatively connected with and actuated by the manually controlled member when manipulated to initiate the operation of the machine, interengageable means on the rock shaft and brake shoes operable to release the brake shoes when the member is manipulated and operable to apply the brake shoes when the machine shaft has completed one revolution, and coacting means on the rock shaft and brake wheel for effecting the rocking of said rock shaft in an opposite direction whereby to effect the application of the shoes, the coacting means being in abutting relation when the shoes have been applied to prevent retrograde movement of the wheel.

5. In a machine of the character set forth, a braking mechanism including a brake wheel, a brake shoe normally disposed out of contact with the brake wheel and means for advancing the brake shoe against the brake wheel consisting of a rockable element and coacting means on the rockable element and brake shoe operable upon rocking motion in one direction to apply the shoe to the brake wheel and operable upon rocking motion in the opposite direction to permit of movement to its normal released position, said coacting means comprising a pair of members provided respectively with radially disposed recesses, rollers journaled in said recesses on radially disposed axes, the peripheries of the rollers of one of said members extending beyond its outer face and the rollers of the other member having their peripheries terminating flush with the outer face and said latter member having depressions adjacent each of said rollers for the accommodation of the projecting peripheral portions of the rollers of the other member.

6. The combination with a machine having a rotary member adapted to make a single revolution upon each operation thereof and including a pedal for initiating each operation; of a mechanism for stopping said member precisely upon the completion of a single revolution, for preventing retrograde movement thereof and for instantly releasing said member at the beginning of each operation, said mechanism including a brake wheel secured to the rotary member for turning movement therewith, a brake shoe normally disposed out of contact with the brake wheel, a rockable element, interengageable means on the brake shoe and rockable element operable to apply the shoe to the wheel when said element is rocked in one direction and serving when the element is rocked in the opposite direction, to permit of the movement of the shoe to its normal released position; and means of connection between the machine pedal and the rockable element for rocking the latter in a direction to permit of the release of the shoe and coacting means on the rockable element and brake wheel operable at the completion of each revolution of the rotary member of the machine, to rock said element in an opposite direction for applying the shoe to the brake wheel, said latter means consisting of an arm projecting radially from the rockable element, a pawl fulcrumed on the brake wheel, a stop on the brake wheel with which the pawl coacts to impinge said pawl against the arm.

7. The combination with a machine having a rotary member adapted to make a single revolution upon each operation thereof and including a pedal for initiating each operation; of a mechanism for stopping said member precisely upon the completion of a single revolution, for preventing retrograde movement thereof and for instantly releasing said member at the beginning of each operation, said mechanism including a brake wheel secured to the rotary member for turning movement therewith, a brake shoe normally disposed out of contact with the brake wheel, a rockable element, interengageable means on the brake shoe and rockable element operable to apply the shoe to the wheel when said element is rocked in one direction and serving when the element is rocked in the opposite direction, to permit of the movement of the shoe to its normal released position; and means of connection between the machine pedal and the rockable element for rocking the latter in a direction to permit of the release of the shoe and coacting means on the rockable element and brake wheel operable at the completion of each revolution of the rotary movement of the machine, to rock said element in an opposite direction for applying the shoe to the brake wheel, said latter means consisting of a pawl fulcrumed on the brake wheel, stop elements for limiting the outward and inward swinging movement of the pawl, an arm secured to and projecting radially from the rockable element, a bracket fulcrumed to the free end of said arm and a roller carried by said bracket disposed in the path of movement of said pawl and adapted to be engaged by the pawl for moving the arm to rock the rockable element.

8. The combination with a machine having a rotary member adapted to make a single revolution upon each operation thereof and including a pedal for initiating each operation; of a mechanism for stopping said member precisely upon the completion of a single revolution, for preventing retrograde movement thereof and for instantly releasing said member at the beginning of each operation, said mechanism including a brake wheel secured to the rotary member for turning movement therewith, a brake shoe normally disposed out of contact with the brake wheel, a rockable element, interengageable means on the brake shoe and rockable element operable to apply the shoe to the wheel when said element is rocked in one direction and serving when the element is rocked in the opposite direction, to permit of the movement of the shoe to its normal released position; and means of connection between the machine pedal and the rockable element for rocking the latter in a direction to permit of the release of the shoe and coacting means on the rockable element and brake wheel operable at the completion of each revolution of the rotary movement of the machine, to rock said element in an opposite direction for applying the shoe to the brake wheel, said latter means consisting of a pawl fulcrumed on the brake wheel, stop elements for limiting the outward and inward swinging movement of the pawl, an arm secured to and projecting radially from the rockable element, a bracket fulcrumed to the free end of said arm and a roller carried by said bracket disposed in the path of movement of said pawl and adapted to be engaged by the pawl for moving the arm to rock the rockable element, said pawl serving to engage behind the roller to prevent retrograde movement of the rotary member of the machine when the brake shoe is subsequently released.

HENRY NAEDER.